Figure 1:
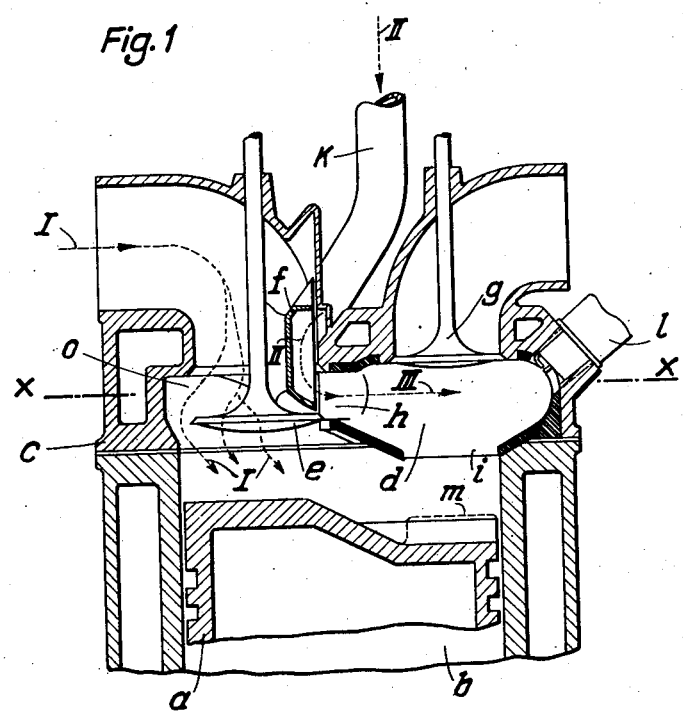

July 16, 1957

F. STÜMPFIG ET AL 2,799,257

FOUR-STROKE INTERNAL COMBUSTION ENGINES
AND METHOD OF OPERATION THEREFOR

Filed Nov. 17, 1953

Inventors
FRIEDRICH STÜMPFIG
CURT BELLWINKEL

BY Robert H. Jacob
AGENT

2,799,257

FOUR-STROKE INTERNAL COMBUSTION ENGINES AND METHOD OF OPERATION THEREFOR

Friedrich Stümpfig and Curt Bellwinkel, Nurnberg, Germany

Application November 17, 1953, Serial No. 392,664

Claims priority, application Switzerland November 15, 1952

13 Claims. (Cl. 123—34)

The invention relates to four-stroke internal combustion engines using light or heavy oil, and to a method of operation therefor. In the method of operation according to the invention, substantially air only is introduced into the cylinder space during the suction stroke and simultaneously or slightly later the fuel is introduced, without air or with only a little air, mainly into a combustion chamber in communication with the cylinder space, while during the compression stroke a portion of the air is forced out of the cylinder space into the combustion chamber and towards the end of the compression stroke the fuel-air mixture is ignited in said combustion chamber, whereupon the ignited fuel-air mixture passes out of the combustion chamber, mixes with the compressed air externally of the combustion chamber, and burns completely during the working stroke.

This method of operation is preferably carried out in such manner that on the one hand the compression is greater than that compression which, even with fuels of a low octane number, would still permit combustion free from knocking given homogeneous mixing of the same amount of fuel with the entire amount of air, and on the other hand at the moment of ignition the combustion chamber is filled with a mixture so rich in fuel and the air compression space in the cylinder is filled only with air or with a mixture so low in fuel, that the mixture is still dependably ignitable in the combustion chamber without risk of knocking and burns substantially without knocking only during and after mixing with the contents of the air compression space. The wall of the combustion chamber is advantageously kept so hot during operation that fuel striking thereagainst evaporates therefrom.

The fuel can first be atomised in a carburetter and mixed with a little air, whereupon this mixture is sucked into the combustion chamber. Alternatively, air can be sucked into the combustion chamber and the fuel injected in atomised form simultaneously into the suction pipe for this air or simultaneously or slightly later directly into the combustion chamber.

A special ignition device can be provided for igniting the fuel-air mixture or the ignition can be achieved, as is known for example in diesel engines, by correspondingly high compression of the contents of the cylinder.

The method of operation of the present invention provides a considerable improvement in internal combustion engines. For example, in mixture-compression internal combustion engines the compression can now be considerably increased while avoiding detonating combustion and the power greatly increased thereby, while the fuel consumption is considerably reduced. The preparation of the fuel for combustion and mixing with air is more favourable, which results in a further increase in power and a further reduction of fuel consumption. Fuels having a high evaporation temperature and a low octane number, so-called heavy fuels, can now also be used for driving light and simple internal combustion engines with mixture compression and likewise give fully satisfactory operation. Without alteration to the drive, heavy oils and also petrols can be used with equally good results, in the same internal combustion engine. Expensive machine parts, such as high-pressure injection pumps, can be dispensed with. Good utilization of the fuel is achieved even in very fast running engines.

An internal combustion engine for carrying out the method of operation of the present invention is provided with a combustion chamber and an air compression space in the cylinder head and the combustion chamber is in open communication with the cylinder space, on the one hand, and with the air compression space, on the other. The combustion chamber of this engine can for example be constructed as a vortex chamber lying flat in the cylinder head, the connection of which to the air compression space is disposed tangentially to the continuously curved wall of the vortex chamber. The connection of the vortex chamber with the cylinder space advantageously lies in the middle of the bottom of the vortex chamber opposite an exhaust valve situated in the roof of the chamber.

Figure 2:
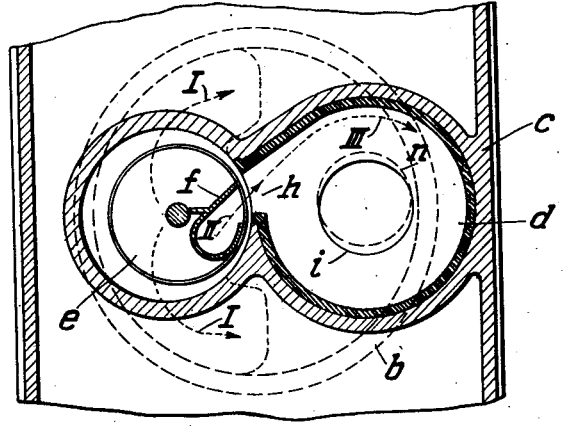

One embodiment of the invention is illustrated by way of example in the accompanying drawing, in which:

Figure 1 shows a longitudinal section through the cylinder head and the upper part of the cylinder of an internal combustion engine, and Figure 2 a cross-section through the cylinder head on the line X—X in Figure 1.

The drawing shows a piston $a$ which reciprocates in known manner in a cylinder $b$. In the cylinder head $c$ are disposed a fuel mixture compression space or combustion chamber $d$, an inlet valve $e$ with a passage member $f$ fastened thereto, and an exhaust valve $g$. When the inlet valve $e$ is closed, the combustion chamber $d$ is in open communication through a passage $h$ entering it tangentially with an air compression space or chamber $o$ situated beneath the inlet valve $e$, and through the opening $i$ leading axially into the cylinder space with the latter. When the inlet valve is open on the other hand, the passage member $f$ is situated in front of the passage $h$ and connects the combustion chamber $d$ with a fuel supply pipe $k$. During the suction stroke, therefore, pure air is sucked into the cylinder space through the open inlet valve in the direction of the arrow I, and a mixture containing a large amount of fuel and a small amount of air, hereinafter called rich mixture, is sucked in the direction of the arrows II and III out of the fuel or rich mixture supply pipe $k$ tangentially into the combustion chamber space and therein set in whirling motion. The cross-sections for the suction of the pure air and for the suction of the rich mixture, and also the hollow space in the combustion chamber, are of such dimensions that during the suction stroke the cylinder space is filled substantially only with pure air, that is to say, that most air containing a little fuel, while the combustion chamber space is filled substantially only with rich mixture, and that the amount of air sucked in is sufficient to burn the fuel sucked in.

Through the whirling motion in the combustion chamber, the drops of fuel contained in the rich mixture are thrown against the wall of the combustion chamber, which in operation is very hot, and are evaporated therefrom, or even on occasion gasified and cracked. The shape of the combustion chamber and the whirling motion taking place therein largely prevent the overflow of fuel droplets out of the combustion chamber into the cylinder space during the suction stroke. While the valves are closed, the piston pushes the air during the compression stroke out of the cylinder space partly into the air compression space $o$ partly through the passage $h$ and the aperture $i$ into the combustion chamber $d$, whereby not only is the whirling motion of the gas, in the direction of the arrow III, in the latter further maintained but also a whirling motion transversely thereto is produced. Through this double whirling motion, complete evaporation of the fuel droplets and good mixing of fuel and air are achieved. Shortly before completion of the compression stroke, that is to say, at the moment of ignition by the spark plug *l*, the mixing of air and fuel in the combustion chamber has progressed so far that the mixture in the vicinity of the spark plug is suitable for combustion and can therefore be dependably ignited and continues to burn after ignition. At approximately the same time or shortly thereafter the compression stroke ends, while the end face of the piston is pushed to a point close in front of the aperture *i* of the combustion chamber. The pressure wave produced at the beginning of the combustion at the spark plug therefore mainly drives the rich mixture still contained in the combustion chamber through the passage *h*, lying approximately opposite the spark plug or slightly offset in relation thereto, into the air compression chamber *o*. Here the rich mixture encounters further air or mixture low in fuel, is mixed therewith, and burns rapidly and completely, but without knocking detonation, during the following working stroke. The exhaust stroke takes place in the customary manner through the fact that the piston moving upwards again drives the combustion gases in the cylinder space through the passage *h* and the opening *i* and through the opened outlet valve into the exhaust pipe. It is particularly desirable for this purpose that the communication aperture *i* should lie substantially opposite the exhaust valve *g*. Thereupon the cycle of operations described is repeated, beginning with the next suction stroke. The technical performance of the method of operation of the present invention can vary in individual parts and as a whole and may also depart considerably from the form of performance described hereinabove. Only a few of these possibilities will be mentioned hereinbelow:

The compression can be made higher than in the customary mixture-compressing Otto cycle four-stroke internal combustion engines. For operation with heavy oil, the combustion engine can first be run hot with a petrol-air mixture and then switched over to heavy oil, or the rich mixture pipe *k* or combustion chamber *d* or a heating unit incorporated in the rich mixture pipe or in the combustion chamber can be electrically heated at the commencement of operation and thereupon the engine started up direct with heavy oil. The rich mixture needed can be produced with the aid of a known carburetter outside the internal combustion engine. It is naturally also possible likewise to suck only pure air through the pipe *k* and either to inject the fuel by means of a simple pump under low pressure into this pipe *k* or to inject it directly into the combustion chamber during the suction stroke or slightly later. Instead of a rich mixture, a fuel vapour, produced in any desired manner outside the internal combustion engine, with or without air, can also be sucked through the pipe *k*, while the fuel droplets still contained are evaporated in the combustion chamber. For sucking the rich mixture into the combustion chamber, a special rich mixture admission valve can also be used, thus dispensing with the passage member *f*. The exhaust valve can of course also be disposed outside the combustion chamber before the exhaust pipe. The combustion chamber *d* can, inter alia, also have the shape of a sphere, or a shape having a heart-shaped cross-section, it may have still more openings and may be disposed inside or outside the cylinder head or cylinder. The latter applies also to the arrangement of the air compression chamber *o*, which is provided in the embodiment illustrated in the cylinder head beneath the inlet valve. The arrangement of the combustion chamber and of the air compression space is conveniently adapted to the over-head or side arrangement of the admission valve and exhaust valve, or vice versa. For the ignition use may also advantageously be made of a spark plug having electrodes projecting far into the combustion chamber. In order to obtain, after ignition, the completest possible scavenging of the rich mixture out of the combustion chamber into the air compression chamber or into the further air stored in the latter, a closure member, for example in the form of a plug *m*, may be disposed on the face of the piston, as indicated in broken lines in the drawing, which plug penetrates into the opening *i* in the top dead centre position of the piston and closes the former for some time; in addition, for the same purpose the construction and arrangement of the combustion chamber can be such that on the one hand the spark plug is situated opposite the opening or openings in the combustion chamber which is or are open after the ignition, and that on the other hand on ignition a mixture having a higher air content and as favourable to combustion as possible is situated near the spark plug. The latter can be achieved in simple manner by disposing the axial opening *i* of the combustion chamber slightly eccentrically in relation to the combustion chamber space, as is indicated in the drawing (Fig. 2) by the circle *n* in a broken line. Excessive disturbing heating of the combustion chamber is avoided, because the combustion chamber wall is cooled on the evaporation of the fuel and by the intense whirling of the air. In addition, the operating temperature of the combustion chamber wall can be kept by less close connection to the cooled parts of the internal combustion engine at a level such that both petrol and heavy oil are perfectly evaporated. Undesirable spontaneous ignition is then not to be feared, because, after introduction into the combustion chamber, the rich mixture is in the first place not ignitable and because the fuel thrown against the hot combustion chamber wall is immediately drawn away from the latter after evaporation in consequence of the continuous whirling motion; this is achieved during the suction stroke through the continuously entering rich mixture and during the compression stroke through the air continuously entering along the combustion chamber wall. In order to prevent the pre-evaporation of readily boiling fuel fractions in the rich mixture supply pipe, or to prevent the deposition of carbon therein, it is advisable to dispose the rich mixture supply pipe and the combustion chamber in such manner in relation to one another, or to insulate them from one another in such manner, that the former remains relatively cool during operation and only the latter becomes very hot. As has already been indicated, internal combustion engines when working on the present principle can also be equipped for spontaneous ignition in the manner known in mixture induction engines. This can also be achieved on the one hand by selecting the compression ratio in the engine sufficiently high for spontaneous ignition and on the other hand so adjusting the introduction of air into the combustion chamber that a self-igniting fuel-air mixture is formed in the combustion chamber only at the desired ignition time, i. e. that spontaneous ignition can occur only at that moment of time. The more air is supplied to the combustion chamber during induction, during the suction stroke or during the compression stroke, the earlier will ignition occur. The internal combustion engine can be so constructed that at high speeds a mixture having a higher air content is introduced into the combustion chamber during the suction stroke, whereby the ignition timing is adapted to engine speed.

Four-stroke internal combustion engines working on the principle of the present invention have substantial advantages over the known Otto-cycle petrol and heavy oil internal combustion engines; thus it is possible to use cheaply produced fuels having a low octane number, such as petrol containing no chemical anti-knock agents, since the final mixing of fuel and air takes place only in the course of combustion, and therefore violent detonating combustion is impossible. Despite the fact that the fuel and air are finally mixed only during combustion, however, combustion of the fuel at the right time is achieved during the working stroke, because even before ignition the fuel is entirely or to a substantial extent vaporised, so that the fuel mixes rapidly and intimately with the air and therefore burns rapidly and completely after mixing. Fully satisfactory operation is possible both with low boiling light oils, such as petrol, and also with high boiling, inexpensive heavy oils, because the introduction of the fuel into the combustion chamber in the form of a rich mixture containing a small amount of air and a large amount of fuel, and not ignitable or only poorly ignitable, and the vigorous whirling motion of the mixture in the combustion chamber during the suction stroke and during the compression stroke permit the use of a combustion chamber which is very hot in operation and reliably evaporates even heavy oils, while undesirable spontaneous combustion is impossible. In consequence of the dependable evaporation of light and heavy oils during the suction stroke and during the compression stroke, the air and the fuel can be introduced without preheating into the cylinder and into the combustion chamber, which provides good cylinder filling, a prerequisite to good engine performance. The latter and the fuel consumption are substantially better than in the known Otto cycle internal combustion engines, because the final mixing of fuel and air only in the course of combustion permits the use of relatively high compression pressures. A further improvement of engine performance and fuel consumption is obtained by the complete or partial storage of the fuel in the hot combustion chamber until the moment of ignition, because this stored fuel can no longer be deposited on the cylinder wall or form larger droplets in the cylinder space, and thus be lost for the performance of work, during the suction stroke and during the compression stroke. Finally, engine performance and fuel consumption are further particularly improved by the complete or partial evaporation of the fuel before ignition, and also by the vigorous whirling motion during the suction stroke, compression stroke, and working stroke, and by the preferred blowing of the rich fuel mixture out of the combustion chamber into the cylinder space and into the air compression space, because by these means excellent mixing of fuel and air and thus complete combustion at the proper time are achieved. The retention of the fuel droplets and the evaporation of the same in the hot combustion chamber until the moment of combustion also prevents the dilution of lubricating oil in the case of heavy oil operation.

As compared with known injection internal combustion engines with spontaneous ignition, the internal combustion engines of the present invention likewise have considerable advantages: fuels having different retardation of ignition, such as petrol and heavy oils, can be used for driving the same engine. An expensive high pressure injection pump, which is liable to fail, and the appertaining injection nozzles are not required, since the fine distribution of the fuel by evaporation and the intimate mixing with air by the very lengthy whirling is more successful than with the aid of a high pressure injection pump. Therefore, even in high speed, inexpensive and light engines, particularly complete combustion and correspondingly good engine power and low fuel consumption are obtained. The evaporation of the fuel and the long whirling of the same with the air in the hot combustion chamber also provides the particular advantage that good ignition and complete combustion occur even without the high compression required in diesel engines, for which reason high fuel gas pressure peaks can be avoided and a smooth, steady running of the engine, together with a further reduction of the cost of manufacture and of the weight of the engines, can be achieved. In consequence of the intimate mixing of fuel and air it is possible to obtain complete combustion of the fuel with a smaller excess of air, and thus to improve still further the efficiency of the engine.

We claim:

1. In an internal combustion engine the combination comprising a cylinder, a piston provided in said cylinder, a cylinder head provided at one end of said cylinder and defining a fuel mixture compression space and an air compression space, said spaces opening into said cylinder, passage means interconnecting said spaces exteriorly of said cylinder, means for closing said passage means during a suction stroke of said piston and opening said passage means during a compression stroke of said piston, a fuel ignition means arranged in said fuel mixture compression space, means for conducting air into said cylinder and said air compression space during a suction stroke of said piston, means for conducting fuel into said fuel mixture compression space during a part of said suction stroke of said piston, said piston forcing a part of the air out of said cylinder and into said air compression space and said fuel mixture compression space during the compression stroke of said piston, said ignition means igniting the fuel mixture in said fuel mixture compression space during the compression stroke of said piston and the pressure formed by said fuel ignition forcing the fuel mixture through said passage means and into said air compression space, said ignited fuel mixture in said air compression space burning completely during the working stroke of said piston, and means for exhausting the combustion gases from said cylinder.

2. In an internal combustion engine the combination comprising a cylinder, a piston provided in said cylinder, a cylinder head provided at one end of said cylinder and defining a fuel mixture compression space and an air compression space, said spaces opening into said cylinder, dual purpose passage means interconnecting said spaces exteriorly of said cylinder during a compression stroke of said piston and connecting said fuel mixture compression space to a fuel supply during a suction stroke of said piston, a fuel ignition means arranged in said fuel mixture compression space, means for conducting air into said cylinder and said air compression space during a suction stroke of said piston, means for conducting fuel into said passage means and said fuel mixture compression space during a part of said suction stroke of said piston, said piston forcing a part of the air out of said cylinder and into said air compression space and said fuel mixture compression space during the compression stroke of said piston, said ignition means igniting the fuel mixture in said fuel mixture compression space and the pressure formed thereby forcing the ignited fuel mixture through said passage means and into said air compression space, said ignited fuel mixture in said air compression space burning completely during the working stroke of said piston, and means for exhausting the combustion gases from said cylinder.

3. In an internal combustion engine the combination comprising a cylinder, a piston provided in said cylinder, a cylinder head provided at one end of said cylinder and defining a fuel mixture compression space and an air compression space, said spaces opening into said cylinder, passage means interconnecting said spaces exteriorly of said cylinder in a first position and connecting said fuel mixture compression space to a fuel supply in a second position, a fuel ignition means arranged in said fuel mixture compression space, an air inlet valve means for introducing air into said cylinder and said air compression space and actuating said passage means to said second position during a suction stroke of said piston, means for conducting fuel into said passage means and said fuel mixture compression space during at least part of said suction stroke of said piston, said piston forcing a part of the air out of said cylinder and into said air compression space and said fuel mixture compression space during the compression stroke of said piston, means for closing said air inlet valve and actuating said passage means to said first position during the compression stroke of said piston, said ignition means igniting the fuel mixture in said fuel mixture compression space and the pressure formed thereby forcing the ignited fuel mixture through said passage means and into said air compression space, said ignited fuel mixture in said air compression space burning completely during the working stroke of said piston, and means for exhausting the combustion gases from said cylinder.

4. In an internal combustion engine the combination comprising a cylinder, a piston provided in said cylinder, a cylinder head provided at one end of said cylinder and defining a fuel mixture compression space and an air compression space, said spaces opening into said cylinder, passage means interconnecting said spaces exteriorly of said cylinder in a first position and connecting said fuel mixture compression space to a fuel supply in a second position, an air inlet valve for introducing air into said cylinder and said air compression space during a suction stroke of said piston, means for connecting said passage means to said air inlet valve for movement to said first position during a compression stroke of said piston and to said second position during a suction stroke of said piston, a fuel ignition means arranged in said fuel mixture compression space, means for conducting fuel through said passage means and into said fuel mixture compression space during a part of said suction stroke of said piston, said piston forcing a part of the air out of said cylinder and into said air compression space and said fuel mixture compression space during the compression stroke of said piston, said ignition means igniting the fuel mixture in said fuel mixture compression space and the pressure formed thereby forcing the ignited fuel mixture through said passage means and into said air compression space, said ignited fuel mixture in said air compression space burning completely during the working stroke of said piston, and means for exhausting the combustion gases from said cylinder.

5. In an internal combustion engine the combination comprising a cylinder, a piston provided in said cylinder, a cylinder head provided at one end of said cylinder and defining a fuel mixture compression space and an air compression space, said spaces each providing an opening into said cylinder on one side thereof, passage means interconnecting said spaces exteriorly of said cylinder during a compression stroke of said piston and connecting said fuel mixture compression space to a fuel supply during a suction stroke of said piston, a fuel ignition means arranged in said fuel mixture compression space, means for conducting air into said cylinder and said air compression space during a suction stroke of said piston, means for conducting fuel into said passage means and said fuel mixture compression space during a part of said suction stroke of said piston, said piston forcing a part of the air out of said cylinder and into said air compression space and said fuel mixture compression space during the compression stroke of said piston, said ignition means igniting the fuel mixture in said fuel mixture compression space and the pressure formed thereby forcing the ignited fuel mixture through said passage means and into said air compression space, said ignited fuel mixture in said air compression space burning completely during the working stroke of said piston, an exhaust valve provided in said fuel mixture compression space opposite said opening into said cylinder for exhausting the combustion gases from said cylinder.

6. In an internal combustion engine the combination comprising a cylinder, a piston provided in said cylinder, a cylinder head provided at one end of said cylinder and defining a fuel mixture compression space and an air compression space, said spaces each providing an opening into said cylinder on one side thereof, passage means interconnecting said spaces exteriorly of said cylinder during a compression stroke of said piston and connecting said fuel mixture compression space to a fuel supply during a suction stroke of said piston, an air inlet valve provided in said air compression space opposite said opening for introducing air into said cylinder and said air compression space during a suction stroke of said piston, a fuel ignition means arranged in said fuel mixture compression space, means for conducting fuel into said passage means and said fuel mixture compression space during a part of said suction stroke of said piston, said piston forcing a part of the air out of said cylinder and into said air compression space and said fuel mixture compression space during the compression stroke of said piston, said ignition means igniting the fuel mixture in said fuel mixture compression space and the pressure formed thereby forcing the ignited fuel mixture through said passage means and into said air compression space, said ignited fuel mixture in said air compression space burning completely during the working stroke of said piston, and an exhaust valve provided in said fuel mixture compression space opposite said opening to said cylinder for exhausting the combustion gases from said cylinder.

7. In an internal combustion engine the combination comprising a cylinder, a piston provided in said cylinder, a cylinder head provided at one end of said cylinder and defining a fuel mixture compression space and an air compression space, said spaces each providing an opening into said cylinder on one side thereof, said opening of said fuel mixture compression space into said cylinder being provided with a nozzle projecting into said cylinder for diffusing the air passing from said cylinder to said fuel mixture compression space, said piston being offset with a shallow recess opposite said nozzle, passage means interconnecting said spaces exteriorly of said cylinder during a compression stroke of said piston and connecting said fuel mixture compression space to a fuel supply during a suction stroke of said piston, an air inlet valve provided in said air compression space opposite said opening for introducing air into said cylinder and said air compression space during a suction stroke of said piston, a fuel ignition means arranged in said fuel mixture compression space, means for conducting fuel into said passage means and said fuel mixture compression space during a part of said suction stroke of said piston, said piston forcing a part of the air out of said cylinder and into said air compression space and through said nozzle and into said fuel mixture compression space during the compression stroke of said piston, said ignition means igniting the fuel mixture in said fuel mixture compression space and the pressure formed thereby forcing the ignited fuel mixture through said passage means and into said air compression space, said ignited fuel mixture in said air compression space burning completely during the working stroke of said piston, and an exhaust valve provided in said fuel mixture compression space opposite said opening to said cylinder for exhausting the combustion gases from said cylinder.

8. In an internal combustion engine the combination comprising a cylinder, a piston provided in said cylinder, a cylinder head provided at one end of the lonigtudinal axis of said cylinder and defining a fuel mixture compression space and an air compression space, said spaces being arranged parallel to each other and laterally of said axis of said cylinder, said spaces each providing an opening into said cylinder on one side thereof, passage means extending laterally of said axis of said cylinder for interconnecting said spaces exteriorly of said cylinder during a compression stroke of said piston and connecting said fuel mixture compression space to a fuel supply during a suction stroke of said piston, an air inlet valve provided in said air compression space opposite said opening for introducing air into said cylinder and said air compression space during a suction stroke of said piston, a fuel ignition means arranged in said fuel mixture compression space opposite said passage means, means for conducting fuel into said passage means and said fuel mixture compression space during a part of said suction stroke of said piston, said piston forcing a part of the air out of said cylinder and into said air compression space and said fuel mixture compression space during the compression stroke of said piston, said ignition means igniting the fuel mixture in said fuel mixture compression space and the pressure formed thereby forcing the ignited fuel mixture through said passage means and into said air compression space, said ignited fuel mixture in said air compression space burning completely during the working stroke of said piston, and an exhaust valve provided in said fuel mixture compression space opposite said opening to said cylinder for exhausting the combustion gases from said cylinder.

9. An internal combustion engine comprising a cylinder, a piston provided in said cylinder, a cylinder head provided at one end of said cylinder and defining a fuel mixture compression space and an air compression space, each of said spaces opening into said cylinder, an air inlet valve means connected to said air compression space and a combustion gas outlet valve means connected to said fuel mixture compression space, said air inlet valve means and said gas outlet valve means operating respectively within a part of the enclosures of said air compression and said fuel mixture compression spaces, means for conducting fuel into said fuel mixture compression space before the compression stroke of said piston, and a fuel ignition means arranged within said fuel mixture compression space, said piston forcing a part of the air out of said cylinder and into said air compression space and said fuel compression space during the compression stroke of said piston, said fuel first reacting with the air in said fuel mixture compression space and after ignition moving into said air compression space and said cylinder to burn completely during the working stroke of said piston.

10. An internal combustion engine comprising a cylinder, a piston provided in said cylinder, a cylinder head provided at one end of said cylinder and defining a fuel mixture compression space and an air compression space, each of said spaces opening into said cylinder, an air inlet valve means connected to said air compression space and a combustion gas outlet valve means connected to said fuel mixture compression space, said air inlet valve means and said gas outlet valve means operating respectively within a part of the enclosures of said air compression and said fuel mixture compression spaces, means for conducting fuel into said fuel mixture compression space before the last quarter of the compression stroke of said piston, and a fuel ignition means arranged within said fuel mixture compression space, said piston forcing a part of the air out of said cylinder and into said air compression space and said fuel compression space during the compression stroke of said piston, said fuel first reacting with the air in said fuel mixture compression space and after ignition moving into said air compression space and said cylinder to burn completely during the working stroke of said piston.

11. An internal combustion engine comprising a cylinder, a piston provided in said cylinder, a cylinder head provided at one end of said cylinder and defining a fuel mixture compression space and an air compression space, each of said spaces opening into each other and said cylinder, an air inlet valve means connected to said air compression space and a combustion gas outlet valve means connected to said fuel mixture compression space, said air inlet valve means and said gas outlet valve means operating respectively within a part of the enclosures of said air compression and said fuel mixture compression spaces, means for conducting fuel into said fuel mixture compression space before the end of the compression stroke of said piston, a fuel ignition means arranged within said fuel mixture compression space, said piston forcing a part of the air out of said cylinder and into said compression chamber and said combustion chamber during the compression stroke of said piston, said ignition means igniting the fuel mixture in said combustion chamber during the compression stroke of said piston and the pressure formed by said fuel ignition forcing the fuel mixture into said air compression space, said ignited fuel mixture burning completely during the working stroke of said piston.

12. An internal combustion engine comprising a cylinder, a piston provided in said cylinder, a cylinder head provided at one end of said cylinder and defining a fuel mixture compression space and an air compression space, each of said spaces opening into said cylinder, an air inlet valve means connected to said air compression space and a combustion gas outlet valve means connected to said fuel mixture compression space, said air inlet valve means and said gas outlet valve means operating respectively within a part of the enclosures of said air compression and said fuel mixture compression spaces, means for introducing atomized fuel into said fuel mixture compression space and distributing and evaporating at least the larger fuel particles upon the walls of said fuel mixture compression space, and a fuel ignition means arranged within said fuel mixture compression space, said piston forcing a part of the air out of said cylinder and into said air compression space and said fuel compression space during the compression stroke of said piston, said fuel first reacting with the air in said fuel mixture compression space and after ignition moving into said air compression space and said cylinder to burn completely during the working stroke of said piston.

13. An internal combustion engine comprising a cylinder, a piston provided in said cylinder, a cylinder head provided at one end of said cylinder and defining a fuel mixture compression space and an air compression space, each of said spaces opening into said cylinder, an air inlet valve means connected to said air compression space and a combustion gas outlet valve means connected to said fuel mixture compression space, said air inlet valve means and said gas outlet valve means operating respectively within a part of the enclosures of said air compression spaces, means for introducing atomized fuel into said fuel mixture compression space through a fuel inlet, means for distributing and evaporating at least the larger fuel particles introduced into said combustion chamber beginning at said fuel inlet along the walls of said fuel mixture compression space, said piston forcing a part of the air out of said cylinder and into said air compression space and said fuel compression space during the compression stroke of said piston, said fuel compression space causing whirling of said air therein, and means for igniting the fuel within said fuel compression space, said fuel first reacting with the air in said fuel mixture compression space and after ignition moving into said air compression space and said cylinder to burn completely during the working stroke of said piston.

References Cited in the file of this patent

UNITED STATES PATENTS

| 887,393 | Haselwander | May 12, 1908 |

FOREIGN PATENTS

| 111,446 | Australia | Aug. 2, 1939 |
| 836,074 | France | Jan. 10, 1939 |
| 818,708 | Germany | Oct. 29, 1951 |
| 857,842 | France | Oct. 1, 1940 |